350-392 SR CROSS REFERENCE SEARCH ROOM
XR 3,475,736

Oct. 28, 3,475,736

LAMELLATE OPTICALLY RESPONSIVE MEMORY ARRANGEMENT

Filed Dec. 23, 1965 2 Sheets-Sheet 1

INVENTOR
S. K. KURTZ
BY Herbert M. Shapiro
ATTORNEY

3475736
OR IN 365/121

United States Patent Office 3,475,736
Patented Oct. 28, 1969

3,475,736
LAMELLATE OPTICALLY RESPONSIVE MEMORY ARRANGEMENT

Stewart K. Kurtz, Berkeley Heights, N.J., assignor to Bell Telephone Laboratories, Incorporated, New York, N.Y., a corporation of New York Filed Dec. 23, 1965, Ser. No. 516,031
Int. Cl. G11b 7/00
U.S. Cl. 340—173 10 Claims

ABSTRACT OF THE DISCLOSURE

An optically responsive bistable store in which plane polarized light is passed through an opaque medium by means of a transparent window formed in response to "select" light incident from the opposite side of the medium. The medium comprises a structure of photoconductive, polarizing, and electrooptic layers. Plane polarized light is incident to the electrooptic layer and of a polarization direction to be absorbed by the polarizing layer.

This invention relates to optical memory systems and, more particularly, to electrically-changeable storage units therefor.

Optical memory systems promise to be quite inexpensive on a cost-per-bit basis as is well known. Accordingly, such systems appear commercially competitive particularly for high capacity memories, and attempts are now being made to implement them. There are, however, certain impediments to the implementation of such systems. One such impediment is the lack of a simple electrically-changeable storage unit which can be accessed optically, for example, by well known digital light deflectors; and, accordingly, a prime object of this invention is to provide one such electrically-changeable storage unit.

The approach to such storage units in the past has been to utilize light responsive characteristics of storage materials for the storage and retrieval of information. In one such memory, for example, described in United States Patent 3,164,816 of J. T. H. Chang, J. F. Dillon, Jr., and U. F. Gianola, issued Jan. 5, 1965, optically generated heat raises a ferrimagnetic material from its compensation temperature at a localized area therein, and a coincidentally generated magnetic field selectively stores information at that area. Flux orientations in the material are determined by the affect thereof on the plane of polarization of reflected or transmitted light. In other memories, information is stored as the presence and absence of spots developed in photographic films. In accordance with these prior art approaches, the necessity for large numbers of lead connections and the problems caused thereby are avoided. Specifically, cumulative inductive loading and mere physical size of large numbers of lead connections are disabling problems as far as cycle time, size, and fabrication expenses are involved. Unfortunately, the problems are avoided at the expense of relatively high power requirements and relatively slow operation in the first instance and the relative permanence of information in the other.

The foregoing and further objects of this invention are realized in one embodiment wherein light (broadly, electromagnetic radiation) is selectively passed through portions of an opaque obstruction in the light path. The obstruction comprises a polarizing sheet having an electrooptic film contiguous one side thereof and a photoconductive film contiguous the other. The films are bounded by transparent electrodes between which a voltage is applied. A broad beam of polarized light is directed at the electrooptic film. The direction of polarization of the light, however, is chosen such that the polarizing film absorbs the light. Light from a digital light deflector is selectively directed at the photoconductive film generating a high conductivity "hole" through that film at a selected position. The term "hole" is used herein to designate a region of high conductivity through the photoconductive film rather than a physical aperture. When the hole is established, the applied voltage, at the selected position, appears across the electrooptic material rotating the polarization direction of that portion of the broad beam thus permitting passage of light through the polarizing film at that position. The "selecting" beam may then be removed. The high conductivity path is sustained by the light being passed by the polarizing film. That light is detected by a detector adjacent the digital light defector. "Stored" light is extinguished by the removal of the voltage in one embodiment, and by the selective short circuiting of the storage positions in another.

Thus, a feature of this invention is an optical storage unit comprising a source of a light beam, means for obstructing that beam, and light responsive means for controllably passing the light beam through selected portions of the obstructing means.

The foregoing and further objects and features of this invention will be understood more fully from a consideration of the following detailed description rendered in conjunction with the accompanying drawing wherein.

Figures 1, 2:
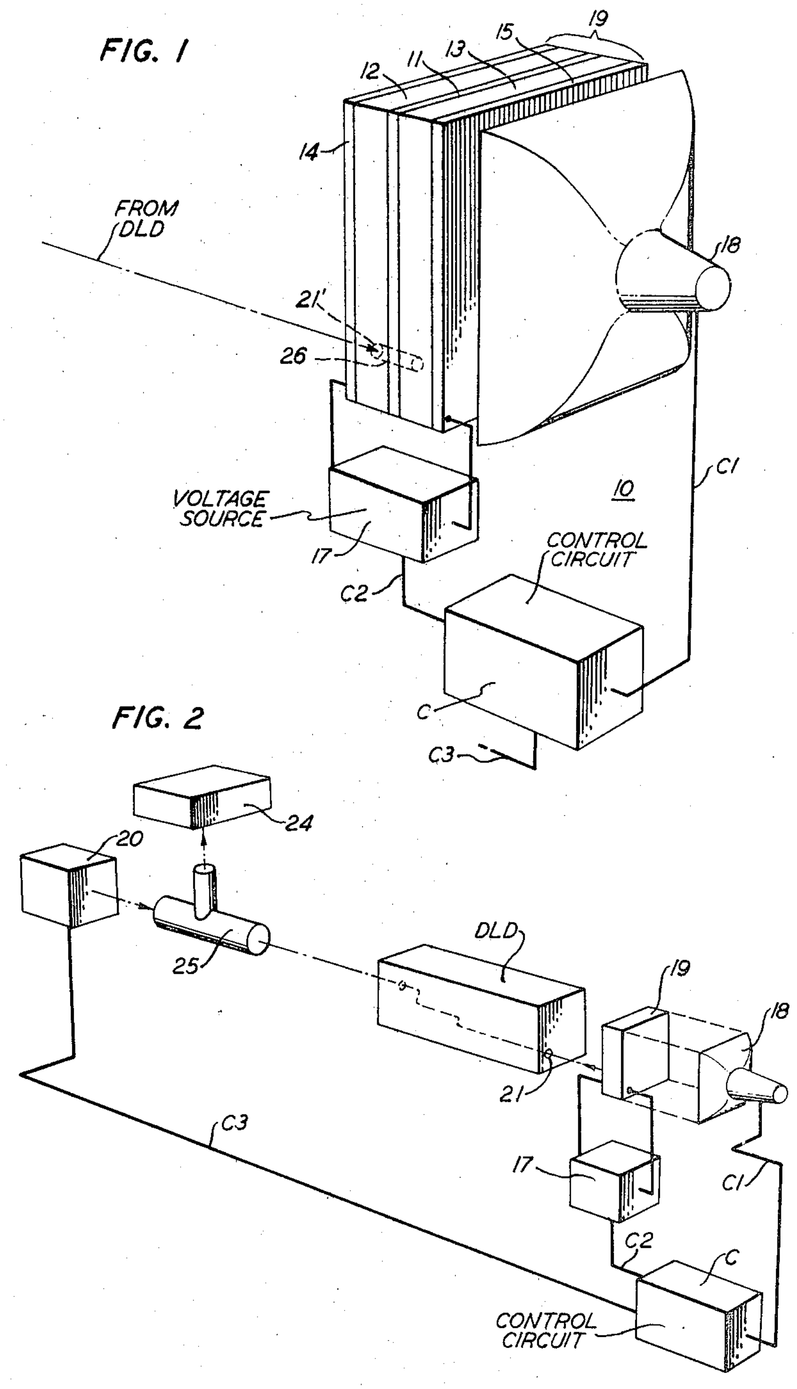
FIGS. 1 and 5 are schematic illustrations of optical storage units in accordance with this invention.
FIG. 2 is a block diagram of an optical memory including a storage unit in accordance with this invention.

Specifically, FIG. 1 shows a storage unit 10 in accordance with this invention. The storage unit comprises a polarizing film (layer) 11 sandwiched between a photoconductive film 12 and an electrooptic film 13. Transparent electrodes 14 and 15 are adjacent films (layers) 12 and 13, respectively, completing a sandwich structure 19. A voltage source 17 is connected between electrodes 14 and 15 and a light source 18 is positioned adjacent electrode 15. Voltage source 17 and light source 18 are connected to a control circuit C via conductors C1 and C2, respectively.

The operation of the storage unit shown in FIG. 1 may be understood most easily with reference to FIG. 2. FIG. 2 shows the storage unit 10 of FIG. 1 with a digital light deflector (DLD) separated from light source 18 by the sandwich structure 19 of the storage unit. Digital light deflectors are well understood in the art. In the illustrative mode of operation such a light deflector is operated in a reflective mode. That is, light from a second light source, typically an optical maser 20, is routed to a particular output position 21 by the digital light deflector DLD and light directed from source 18 through a portion of the sandwich structure 19 back into the output end of the digital light deflector is detected by a utilization circuit 24 via an optical isolator 25. The term "reflective mode" usually refers to the reflection of the output light from the digital light deflector back through the deflector by a mirror positioned at the image plane. Rather than light being so reflected herein, it is supplied in accordance with this invention.

In operation then, source 18, under the control of control circuit C, provides a relatively broad beam of light polarized in a direction for absorption by polarizing film 11 of the sandwich structure 19 of the storage unit. Light from source 20 (FIG. 2), also under the control of control circuit C, is routed through digital light deflector DLD, in a manner well understood in the art, to an output position (or angle) 21 from which position the beam is directed (or focused) on the sandwich structure 19 positioned at the image plane. A connection C3 is shown in FIG. 2 (and indicated in FIG. 1) between source 20 and control circuit C to this end.

The light beam generates electron-hole pairs in the photoconductive film 12 at a selected position 21' therein, corresponding to the selected output position (angle) 21, providing a high conductivity hole, designated 26 in FIG. 1, therethrough. A voltage V17 is applied concurrently between electrodes 14 and 15, via voltage source 17, also under the control of control circuit C. By virtue of the high conductivity hole, that voltage at the hole 26 is now applied across, essentially, only the electrooptic film 13 generating an electric field thereacross. The "dark" resistance R*pc*(0) of the photoconductive film (corresponding to a binary zero or "0") is chosen much greater than the resistance R*eo* of the electrooptic film and/or the resistance R*p* of the polarizing film to insure such operation as will become clear hereinafter. This relationship may be stated symbolically as $Rpc(0) \gg Reo + Rp$ where $Reo > Rp$.

The voltage across the electrooptic film generates a field which rotates the polarization of that portion of the polarized beam from source 18 which is incident to the electrooptic film 13 at the selected position. Symbolically, $Rpc(1) \ll Reo + Rp$ (where $Rp < Reo$) for the illuminated condition (corresponding to a binary one or "1"). Consequently, that portion of the beam from source 18 is passed through hole 26 in the polarizing film generating electron-hole pairs for sustaining that high conductivity hole. The selecting beam from the digital light deflector is then removed and a binary one is stored (written) in position 21' of the storage unit. Additional binary ones may be stored sequentially or in a word-organized manner as described for example in copending application Ser. No. 437,769, filed Mar. 8, 1965 for W. J. Tabor, and now Patent No. 3,438,005. A binary zero may be stored by shuttering (by well known means not shown) the selecting beam from source 20 during a write-in operation.

Read out of the storage unit in accordance with this invention is afforded merely by setting the digital light deflector to route light from source 20 to a selected output position. In accordance with this invention, however, source 20 provides no light during a read operation under the control of control circuit C. Each of those interrogated positions in which a high conductivity hole was generated during previous store operations provides (passes) light which is routed properly through the digital light deflector when the deflector is set for the interrogated position. Light so routed is directed, for detection, to utilization circuit 24 via optical isolator 25. Information is erased from the storage unit, conveniently, by interrupting the voltage applied between electrodes 14 and 15 under the control of control circuit C. To this end, voltage source 17 may include a switch (not shown) operable under the control of control circuit C.

The light sources, deflectors, detectors, et cetera, described may be any such elements capable of operation in accordance with this invention.

A proper choice of light intensity of the beam from source 18 and the voltage V17 supplied by source 17 provides a threshold for the selection beam below which there is no cumulative effect on the electrooptic medium. Such a choice insures that the digital light deflector is subcritical until a selecting beam illuminates a spot thus avoiding crosstalk between selected and nonselected positions in the storage unit.

Figures 3, 5:
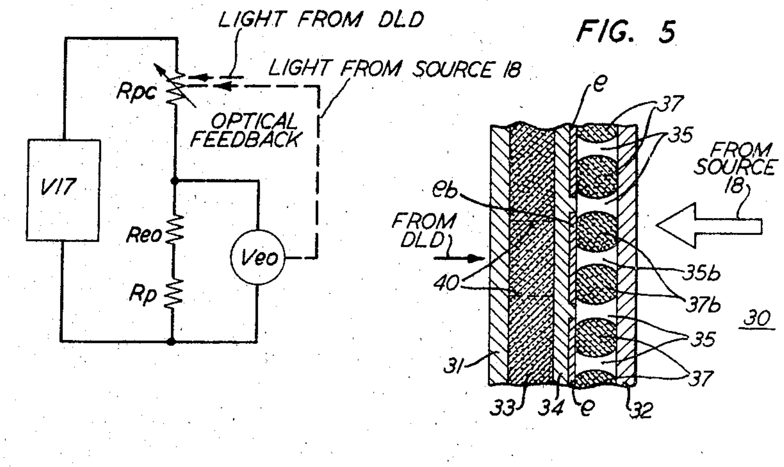
FIG. 3 is an equivalent circuit for a selected position of the storage unit of FIG. 1.

The equivalent circuit for a selected position of the storage unit is shown in FIG. 3. The circuit shows the voltage V17 from source 17 applied across the resistances R*pc*, R*p* and R*eo* of the photoconductive film, the polarizing film, and the electrooptic film, respectively. Light from the digital light deflector directed at the photoconductive film lowers resistance R*pc*. This change in resistance is indicated by the arrow through the symbol for R*pc* in FIG. 3. For the condition $Rpc(0) \gg Reo$ and R*p* (which is relatively low), only negligible voltage drop appears initially across resistance *Reo*. When the selecting beam illuminates a selected spot of the photoconductive film, resistance R*pc*(0) decreases to R*pc*(1) and, essentially, the entire voltage drop appears across resistance R*eo* as indicated by the encircled V*eo* across R*eo* (and R*p*) in the figure. Thereafter, light from source 18 (as a function of V*eo* across R*eo*) maintains the resistance R*pc*(1) low as indicated by the broken arrow designated "optical feedback," between the V*eo* and R*pc* representations in FIG. 3.

The stability of the circuit of FIG. 3 is expressed by the following equation:

$$\frac{V17}{V\pi} = g\left[1 + \frac{\alpha}{1 + aIo\sin^2\left(\frac{\pi}{2}g^2\right) + aId}\right] \qquad (1)$$

where $g = Veo/V\pi$, $\alpha = Rpc(0)/Reo$ is the ratio of the dark resistance of the photoconductive material to that of the electrooptic material, I*o* is the incident intensity of the beam from source 18, I*d* is the incident intensity of the digital light deflector beam, *a* is a factor characterizing the spread of absorbed light through the photoconductive layer and is determined by the sensitivity of the photoconductive material and the intensity of incident light, and V$\pi$ is the voltage (characteristic for a given material and geometry) for rotating 90 degrees the plane of polarization of light incident to the electrooptic material.

Figure 4:
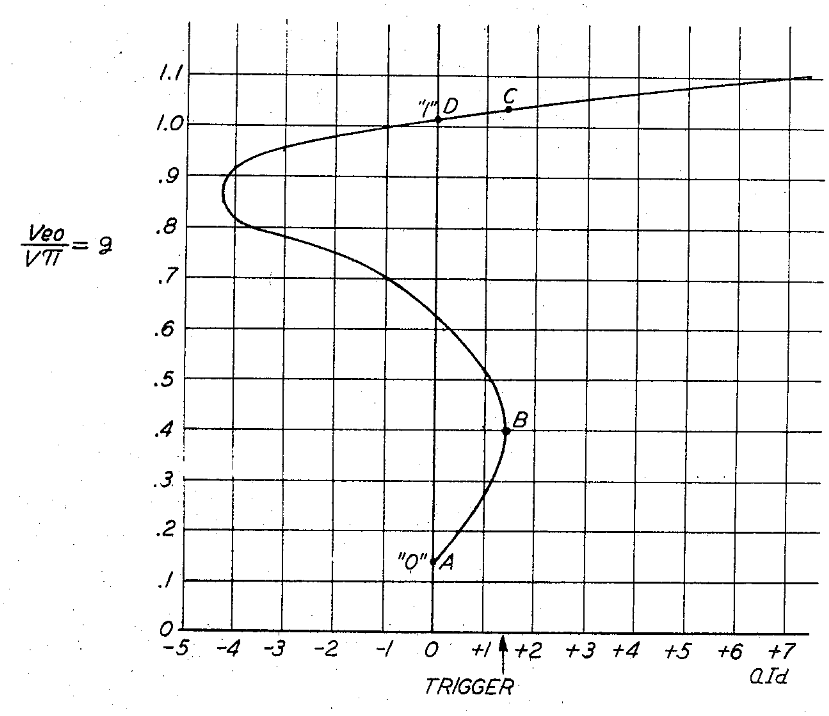
FIG. 4 is a plot of the performance characteristic for the equivalent circuit of FIG. 3.

A plot of $g = Veo/V\pi$ versus *aId* is shown in FIG. 4 wherein $$aId = \frac{\alpha}{\left(\frac{1.5}{g} - 1\right)} - \left[1 - 20\sin^2\left(\frac{\pi}{2}g^2\right)\right]$$

which is obtained from Equation 1 letting $aIo = 20$, $V17/V\pi = 1.5$ and solving for *aId*. The plot illustrates clearly the unstable region where the electrooptic switch jumps discontinuously to a higher value of *g*. Specifically, when light from the digital light deflector is incident on a selected position, *aId* increases from an initial value of 0 at which $g = .136$ (point A in FIG. 4) to a value of 1.5 for the selected position. This change causes *g* to change discontinuously from .4 (point B) to 1.03 (point C) as shown in FIG. 4. When the light from the digital light deflector is removed ($aId = 0$), *g* drops slightly to 1.01 (point D). The two bistable operating points are points A and D corresponding to a binary "0" and a binary "1," respectively, as indicated in the figure. To reset the device (to a "0") in the embodiment of FIG. 1, the voltage V17 is removed, returning the system to point A. The fractional light intensity from source 18 transmitted through the selected position of the storage unit towards the digial light deflector has the values, from the term $$\sin^2\left[\frac{\pi}{2}g^2\right]$$

.08, 6.15, 99.1, and 99.9 (percent) at points A, B, C, and D, respectively.

Under the conditions where the light beam from source 18 is being passed by a selected position, there is a tendency for areas of the photoconductive material of film 12 next adjacent the selected position to be triggered to a "1" condition also. In this manner the electrooptic film could "walk out." The term "walk out" is used to describe the successive switching of fringe areas about a selected position (of increasingly large area), by the beam from source 18, until the entire electrooptic film is switched to the "1" condition.

The possibility of walk out is precluded, conveniently, by making electrode 15 of storage unit 19 opaque and selectively reducing the electrode to transparent thicknesses at positions corresponding to the output positions of the digital light deflector. Such an electrode is provided by well known selective etching and/or deposition techniques.

Typical operating values for the embodiment of FIG. 1 are $V17=120$ volts, $V\pi=80$ volts, $Rpc(0)=10^8$ ohms, $Rpc(1)=(5\times10^6$ ohms), $Reo=10^7$ ohms, $Rp=5\times10^5$ ohms, and $\alpha=10$. The duration of the selection beam is typically less than five milliseconds and may be as low as $5\mu$ seconds depending on the materials and film thicknesses employed. The electrooptic film is typically five mils thick, the polarizing film is on the order of one mil thick, and the photoconductive film is typically one mil thick. $Veo$ changes, typically, from 12 to 80 volts during a write operation.

It is assumed herein that the electrooptic material is isotropic in the absence of an applied field. It is also assumed that an electric field across the electrooptic material induces a birefringence with axes nonparallel to the axes of the (polarized) light beam from source 18 or the polarizing film 11.

FIG. 5 is a fragmentary schematic section of an optical storage unit 30 in accordance with this invention. The storage unit 30 permits a selected location therein to be erased without disturbing information stored at non-selected locations. The storage unit comprises first and second transparent electrodes 31 and 32. Between electrodes 31 and 32 are disposed a photoconductive layer 33, a polarizing film 34, and, in addition, an electrooptic "layer" in the form of discrete spots 35 encompassed by photoconductive rings 37. An additional transparent electrode *e* is electrically in contact with a corresponding photoconductive ring and discrete electrooptic spot. As in the previous embodiment, a voltage source (not shown) is connected between the electrodes 31 and 32 for providing a voltage V thereacross. The structure is realized by straightforward selective deposition and/or photoetching techniques.

The resulting sandwich structure is disposed in a manner shown in FIG. 2 such that light from source 18 impinges on all the electrooptic spots 35. As described hereinbefore, light from source 18 is chosen of a polarization direction such that it is absorbed by polarizing film 34.

In the embodiment of FIG. 5, electrooptic spots 35 correspond in number and position to the output positions of the digital light deflector. Consider that the output of the digital light deflector, incident on photoconductive layer 33 is directed at a representative selected electrooptic spot *5b*. A high conductivity hole 40 is provided through the photoconductive layer at the selected position. The voltage V (of FIG. 1) thus would appear across selected spot **35*b* permitting light from source 18 to pass at that spot for detection by, for example, detector 24** of FIG. 2. In this manner, a binary one is written. Again by suitable shuttering of the selecting beam from digital light deflector DLD during a write operation, a binary zero is stored. The write operation is entirely analogous to that described for the storage unit of FIG. 1. So is the read operation. Neither are discussed further herein. In accordance with the embodiment of FIG. 5, however, the erase operation is selective.

Visualize the ring **37*b* about electrooptic spot 35*b*. The ring is of photoconductive material with a relatively high (through) resistance with respect to that of the electrooptic material (spot 35*b***). The voltage present across the electrooptic spot (selected) is actually present between (transparent) electrode *eb* (in contact with the selected electrooptic spot **35*b*) and the corresponding portion of electrode 32. So long as the ring 37*b* about that spot 35*b* is of high through resistance, the voltage drop (and the electric field) is, essentially, across the spot 35*b*. If, however, that photoconductive ring is made highly conductive, the spot 35*b* is, essentially, short circuited and is returned to its isotropic state extinguishing light from source 18** passed at that position.

This is precisely what is done for selective erasing in the embodiment of FIG. 5. That is, the photoconductive ring about each electrooptic spot is selectively short circuited through the corresponding ring 37. To this end, a suitable light source (not shown) like source 20 of FIG. 2 is capable of providing light having a wavelength to which the photoconductive material of layer 33 is relatively insensitive and that of rings 37 is sensitive. Such a compatible wavelength is, for example, 6328 angstrom units available from a helium-neon optical maser. The source also provides a wavelength of 4600 angstrom units for write and read selection to which layer 33 is sensitive and rings 37 are relatively insensitive. Suitable materials for photoconductive spots 37 are cadmium-selenide with a cooper impurity concentration, CdSe:Cu (sensitive to light of 8000–9000 angstrom units), and cadmium sulfide with a copper impurity concentration, CdS:Cu (sensitive to light of about 6000 angstrom units). Suitable materials for photoconductive material for layer 33 are zinc selenide with a copper impurity concentration, ZnSe:Cu (sensitive to light of about 4700 angstrom units), and zinc sulfide with a copper impurity concentration, ZnS:Cu (sensitive to light of about 4500 angstrom units). The various light sources, deflectors, et cetera, may be any such elements capable of operating in accordance with this invention. Notice that FIG. 5 shows the selecting beam forming a high conductivity hole 40 having a width to correspond to a selected electrooptic spot and its encompassing photoconductive ring.

A characteristic of a digital light deflector is that light issues at the output position (or angle) thereof with a particular orientation for the polarization direction. If operation in the reflective mode is anticipated, the polarization direction of light re-entering the output of the deflector is necessarily in that particular orientation. Such an orientation is provided most simply by selecting the axes of birefringence of the polarizing film 11 (of FIG. 1) or 34 (of FIG. 5) at 45 degrees with respect to the particular orientation desired. Light incident to the output of the digital light deflector, then, always has a component in the required orientation. Alternatively, any well known correcting element (not shown) may be positioned between the storage unit, in accordance with this invention, and the digital light deflector for providing a suitable polarization orientation.

Various materials have been suggested for a storage unit in accordance with this invention. Such materials are representative of any such materials having advantageous resistances to provide the described bistable operation in accordance with this invention. Advantageously, the materials are deposited on a structurally stable layer such as a glass substrate (not shown) for avoiding additional resistances which might be introduced into the device were the various layers spaced apart. The layers may be spaced apart if they are separated by transparent, low resistance spacing layers of, for example, tin oxide.

No effort has been made to exhaust the possible embodiments of this invention. It will be understood that the embodiments described are merely illustrative of the principles of this invention and that various modifications may be made therein by one skilled in the art without departing from the scope and spirit of the invention.

What is claimed is:

1. An optical storage arrangement comprising opaque means for interrupting a beam of polarized light directed at a first surface thereof, said opaque means comprising a layered structure including a polarizing layer for extinguishing light polarized in a first direction and means responsive to light directed at a selected area of a second surface of said opaque means for locally rotating the direction of polarization of light simultaneously incident to said first surface, said last-mentioned means comprising a layer of electrooptic material and a continuous layer of photoconductive material separated by said polarizing layer, means for directing at a first surface of said opaque means a beam of light polarized in said first direction, and means for directing light at a selected area of said second surface while said light polarized in said first direction is incident to said first surface thereby rotating light polarized in said first direction to a second direction enabling that polarized light to pass through said polarizing layer there.

2. A combination in accordance with claim 1 wherein said opaque layer also comprises first and second electrodes contiguous said photoconductive and said electrooptic layer respectively, said first electrode being transparent and continuous, said second electrode being continuous and opaque but including a plurality of positions therein transparent to light, and means for applying between said electrodes a voltage of a value to induce birefringence in said electrooptic layer.

3. A combination in accordance with claim 1 also including first and second continuous transparent electrodes contiguous said photoconductive and said electrooptic layer respectively and means for applying between said electrodes a voltage of a value to induce birefringence in said electrooptic layer.

4. A combination in accordance with claim 3 wherein the resistance of said photoconductive layer is high compared to that of said electrooptic layer and the resistance of said polarizing layer is low for applying said voltage across said electrooptic layer at said selected position for rotating the polarization direction of said first beam.

5. A combination in accordance with claim 4 including means adjacent said photoconductive layer for detecting said first beam at said selected position.

6. A combination in accordance with claim 4 including means for removing said voltage.

7. A combination in accordance with claim 4 including means for selectively short circuiting said selected position.

8. A combination comprising a source for providing a first beam of light, opaque means for interrupting said beam, and optically responsive means for controllably providing transparent portions in said opaque means for selectively permitting passage of said first beam therethrough including a photoconductive layer, a polarizing layer, an electrooptic layer, first and second transparent electrodes adjacent said photoconductive and electrooptic layers respectively, and means connected between said first and second electrodes for applying a voltage of a value to induce birefringence in said electrooptic layer, wherein said electrooptic layer comprises discrete spots and a photoconductive ring about each of said spots, a transparent electrode in contact with each of said rings, and means for selectively making said photoconductive rings highly conductive for short circuiting corresponding electrooptic spots.

9. A combination in accordance with claim 8 wherein said means for selectively making said rings conductive comprising a source of light of a wavelength to which said rings are sensitive and said photoconductive layer is essentially insensitive, and means for routing said last mentioned light to said selected position.

10. A combination in accordance with claim 3 wherein said photoconductive layer has a first resistance, said polarizing and electrooptic layers have resistances lower than said first resistance, said voltage applying means provides an electric field through said layers essentially through said photoconductive layer by virtue of its relatively high first resistance, and said light directed at a selected area of said second surface decreases said first resistance at a selected position for providing said electric field at said selected position essentially only through said electrooptic layer.

References Cited

UNITED STATES PATENTS

| | | | |
|---|---|---|---|
| 2,975,291 | 3/1961 | Loebner et al. | 340—173 X |
| 2,983,824 | 5/1961 | Weeks et al. | 350—150 X |
| 3,252,000 | 5/1966 | McNaney | 350—150 X |
| 3,312,827 | 4/1967 | McNaney | 350—150 X |

OTHER REFERENCES

H. Fleischer et al., "Radiation Controlled Radiation Gate," IBM TDB v. 6, n. 3, August 1963, pp. 73–74.

R. M. Schaffert, "Photostorage System," IBM TDB v. 5, n. 3, August 1962, pp. 54–56.

BERNARD KONICK, Primary Examiner

JOSEPH F. BREIMAYER, Assistant Examiner

U.S. Cl. X.R.

250—220, 225, 229; 350—150